(12) United States Patent
Slover

(10) Patent No.: US 10,477,948 B2
(45) Date of Patent: Nov. 19, 2019

(54) REMOVABLE DEVICE FOR MOUNTING ACCESSORIES TO A HELMET

(71) Applicant: TASK RACING LLC, Plymouth, MA (US)

(72) Inventor: Mark H. Slover, Plymouth, MA (US)

(73) Assignee: Task Racing LLC, Plymouth, MA (US)

( * ) Notice: Subject to any disclaimer, the term of this patent is extended or adjusted under 35 U.S.C. 154(b) by 206 days.

(21) Appl. No.: 15/264,535

(22) Filed: Sep. 13, 2016

(65) Prior Publication Data
US 2018/0070711 A1    Mar. 15, 2018

(51) Int. Cl.
| | |
|---|---|
| A45F 5/02 | (2006.01) |
| A42B 3/04 | (2006.01) |
| F16M 13/04 | (2006.01) |
| F16M 11/04 | (2006.01) |
| F16M 11/10 | (2006.01) |
| F21L 13/00 | (2006.01) |
| F16B 1/00 | (2006.01) |
| F16B 5/02 | (2006.01) |

(52) U.S. Cl.
CPC .............. *A45F 5/02* (2013.01); *A42B 3/04* (2013.01); *A42B 3/042* (2013.01); *A42B 3/044* (2013.01); *F16M 11/041* (2013.01); *F16M 11/10* (2013.01); *F16M 13/04* (2013.01); *F21L 13/00* (2013.01); *A45F 2005/025* (2013.01); *A45F 2200/0533* (2013.01); *F16B 5/0216* (2013.01); *F16B 2001/0028* (2013.01)

(58) Field of Classification Search
CPC ..... A42B 3/0433; A42B 3/044; A42B 3/0406; A42B 3/042

USPC .......... 224/181; 248/139, 140–143, 923, 371, 248/398, 291.1, 479, 486, 652; 362/105–106, 191
See application file for complete search history.

(56) References Cited

U.S. PATENT DOCUMENTS

| | | | | |
|---|---|---|---|---|
| 2,421,643 | A * | 6/1947 | Ostli ..................... | A42B 3/044 362/106 |
| 3,069,539 | A * | 12/1962 | Kidd ..................... | A42B 3/044 24/3.11 |
| 4,998,187 | A * | 3/1991 | Herrick ................. | A42B 3/044 224/181 |
| 7,152,836 | B2 * | 12/2006 | Pfister .................. | F16C 11/103 248/292.14 |
| 8,746,635 | B2 * | 6/2014 | Kim ...................... | F16M 11/10 248/133 |
| 2007/0176067 | A1 * | 8/2007 | Monaco ................ | F16M 11/10 248/284.1 |

(Continued)

*Primary Examiner* — Scott T Mcnurlen
(74) *Attorney, Agent, or Firm* — Sherman IP LLP; Kenneth L. Sherman; Steven Laut

(57) ABSTRACT

An apparatus includes a mounting component with an opposed exterior surface configured to adapt to a curvature of a helmet via an attachment portion and angularly defined guide rails and friction slots. A cradle includes an exterior portion configured to receive an accessory and friction receiving coupler to integrate said cradle to said mounting component whereby cradle will travel non-linearly along the angularly defined guiderails of the mounting component. Friction inducing elements increase friction between the mounting component and the cradle where the friction is induced by mechanical elements, where the mechanical elements are adjustable by hand power.

15 Claims, 5 Drawing Sheets

(56) References Cited

U.S. PATENT DOCUMENTS

2012/0057360 A1\* 3/2012 Swan .................. A42B 3/04
362/389

\* cited by examiner

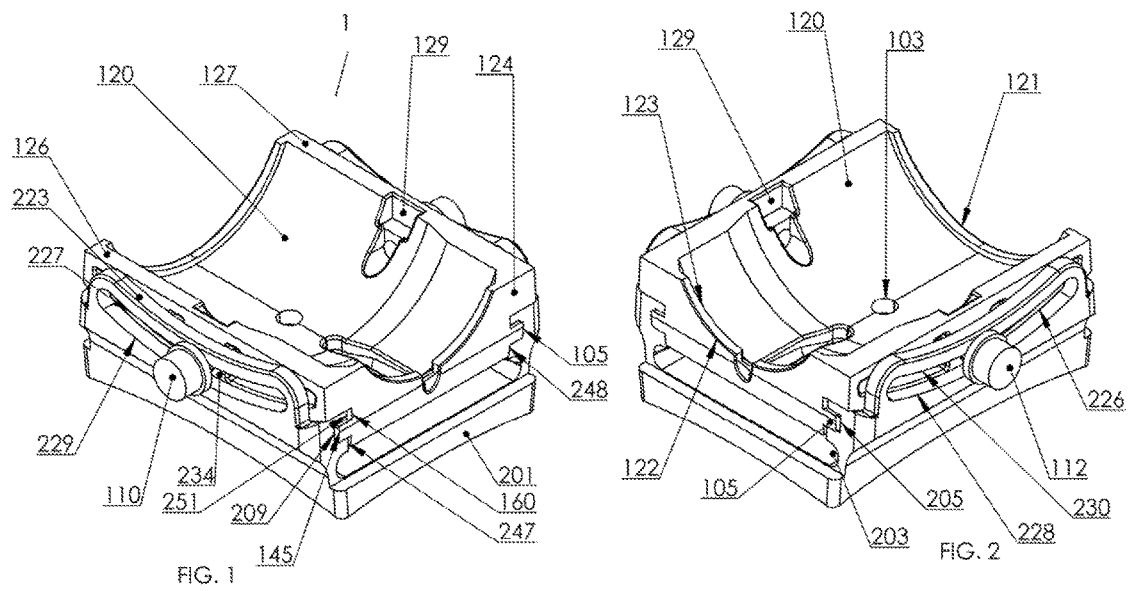
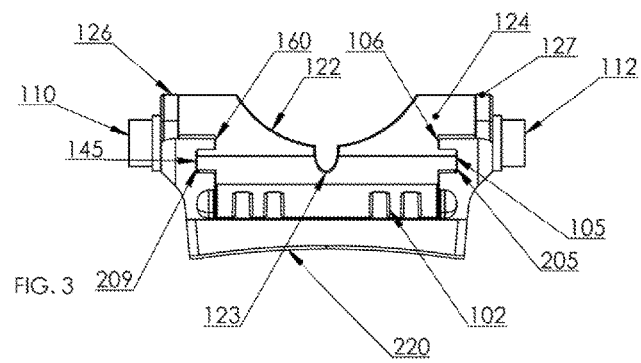
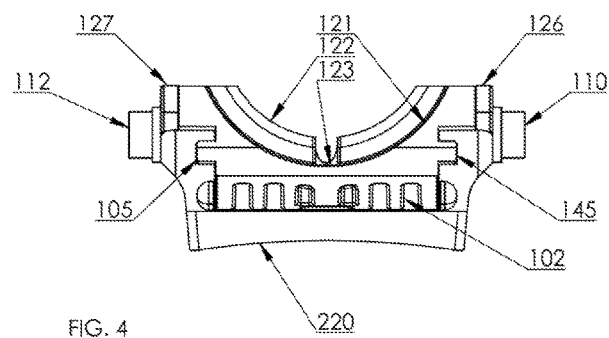

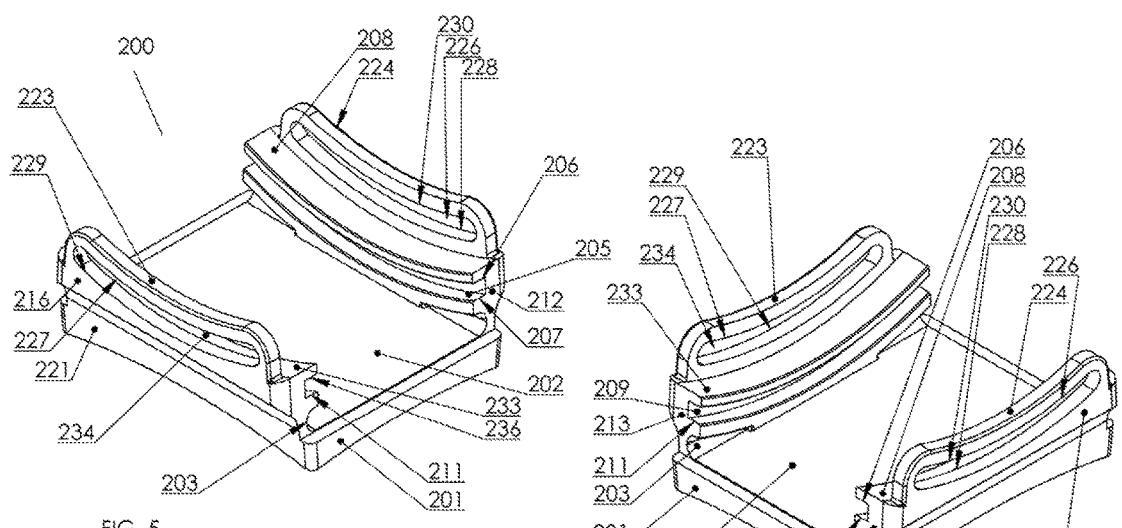
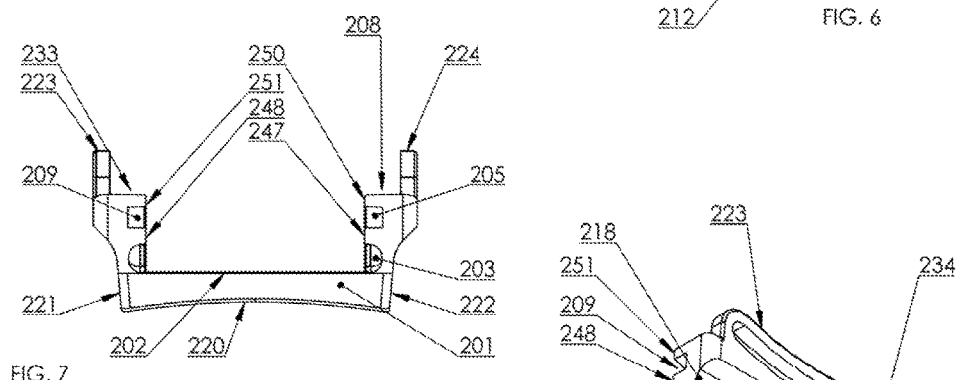
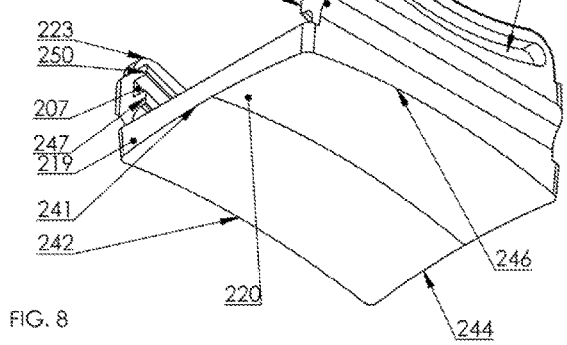

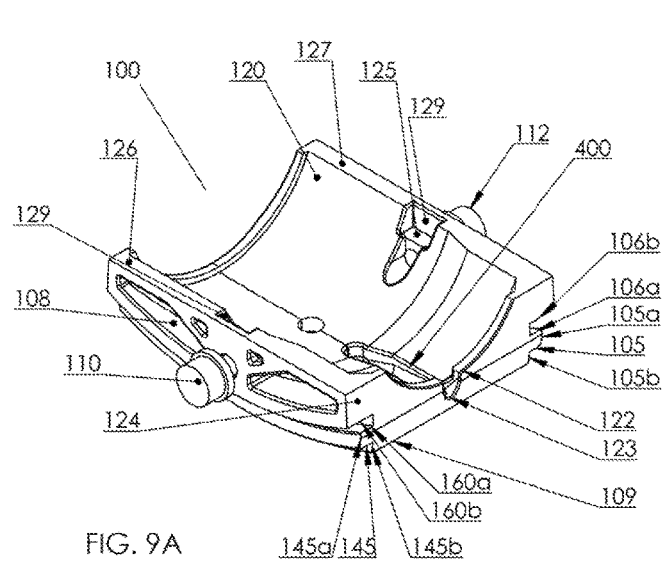
FIG. 9A
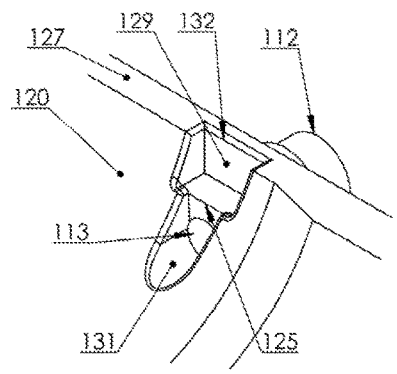
FIG. 9B
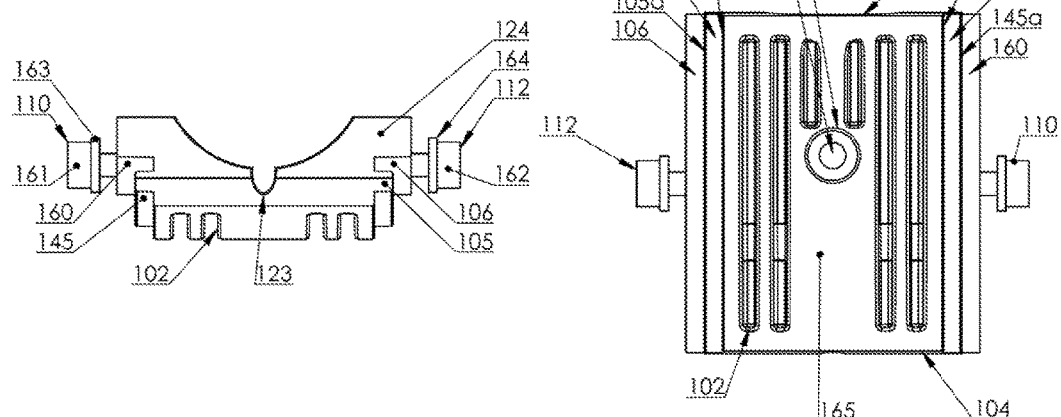
FIG. 10
FIG. 11
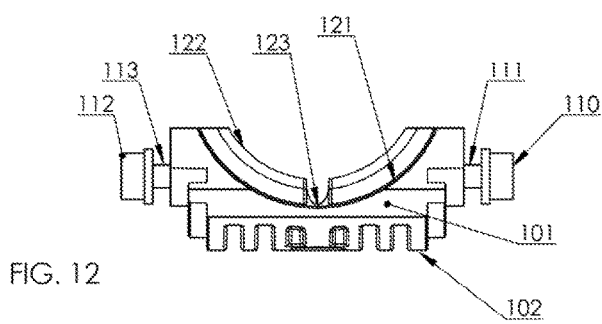
FIG. 12

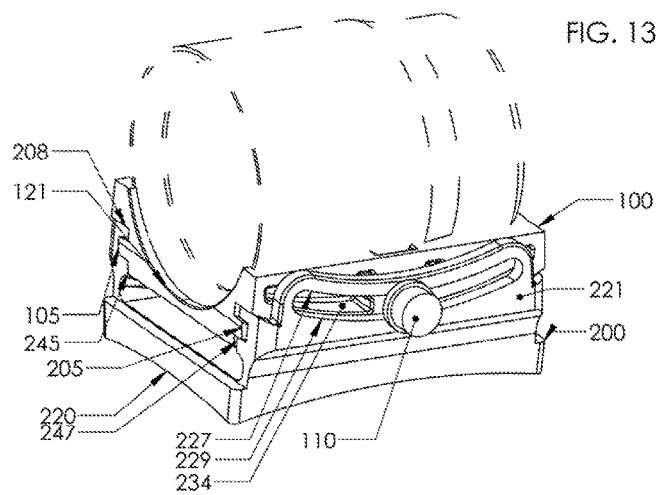
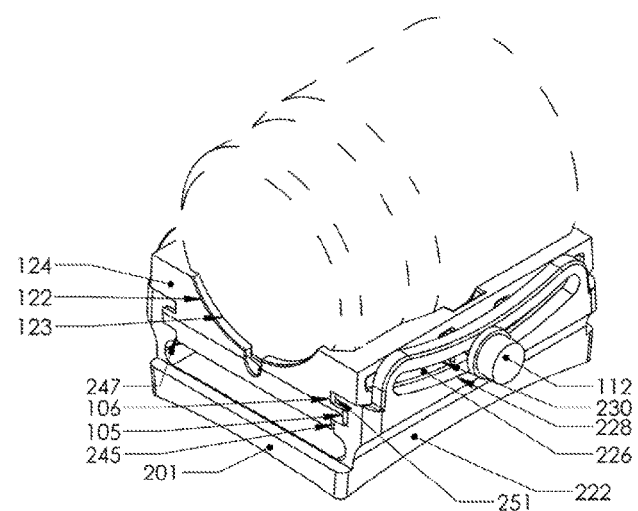

REMOVABLE DEVICE FOR MOUNTING ACCESSORIES TO A HELMET

BACKGROUND

Persons engaging in biking, road motorcycle riding, skiing, snowmobiling, auto racing and other sports, and other types of occupational usage have become interested in making and viewing video recordings of their participation in activities. Such recordings are typically made by other parties capturing the participant on video. Other accessories, such as lighting, are worn or held by participants to assist when partaking in an activity at night, or in a dark environment.

SUMMARY

Embodiments relate to removable devices for mounting accessories to a helmet. One embodiment comprises an apparatus that includes a mounting component with an opposed exterior surface configured to adapt to a curvature of a helmet via an attachment portion. A cradle includes an exterior portion configured to receive an accessory and a non-linear coupler to integrate the cradle to the mounting component.

These and other features, aspects and advantages of the present invention will become understood with reference to the following description, appended claims and accompanying figures.

BRIEF DESCRIPTION OF THE DRAWINGS

FIG. 1 shows an attachment device for an accessory, according to an embodiment.

FIG. 2 shows a right side rear oblique view of the attachment device, according to an embodiment.

FIG. 3 shows a rear profile view of the attachment device, according to an embodiment.

FIG. 4 shows a frontal profile view of the attachment device, according to an embodiment.

FIG. 5 shows a left side oblique view of a mounting head portion of the attachment device, according to an embodiment.

FIG. 6 shows a right side oblique view of the mounting head portion of the attachment device, according to an embodiment.

FIG. 7 shows a rear elevation of the mounting head portion of the attachment device, according to an embodiment.

FIG. 8 shows a bottom oblique view of the mounting head portion of the attachment device, according to an embodiment.

FIG. 9A shows a left side oblique rear view of a cradle portion of the attachment device, according to an embodiment.

FIG. 9B shows a detailed view of a tightening mechanism detailed at a larger scale, according to an embodiment.

FIG. 10 shows a rear elevation of the cradle portion of the attachment device, according to an embodiment.

FIG. 11 shows a bottom elevation view of the cradle portion of the attachment device, according to an embodiment.

FIG. 12 shows a frontal elevation of the cradle portion of the attachment device, according to an embodiment.

FIG. 13 shows an embodiment of the attachment device in a left fontal oblique view where an example light accessory is attached to the cradle portion of the attachment device, according to an embodiment.

FIG. 14 shows the attachment device in a right rearward oblique view where an example light is attached to the cradle portion of the attachment device, according to an embodiment.

DETAILED DESCRIPTION

Figure 15:
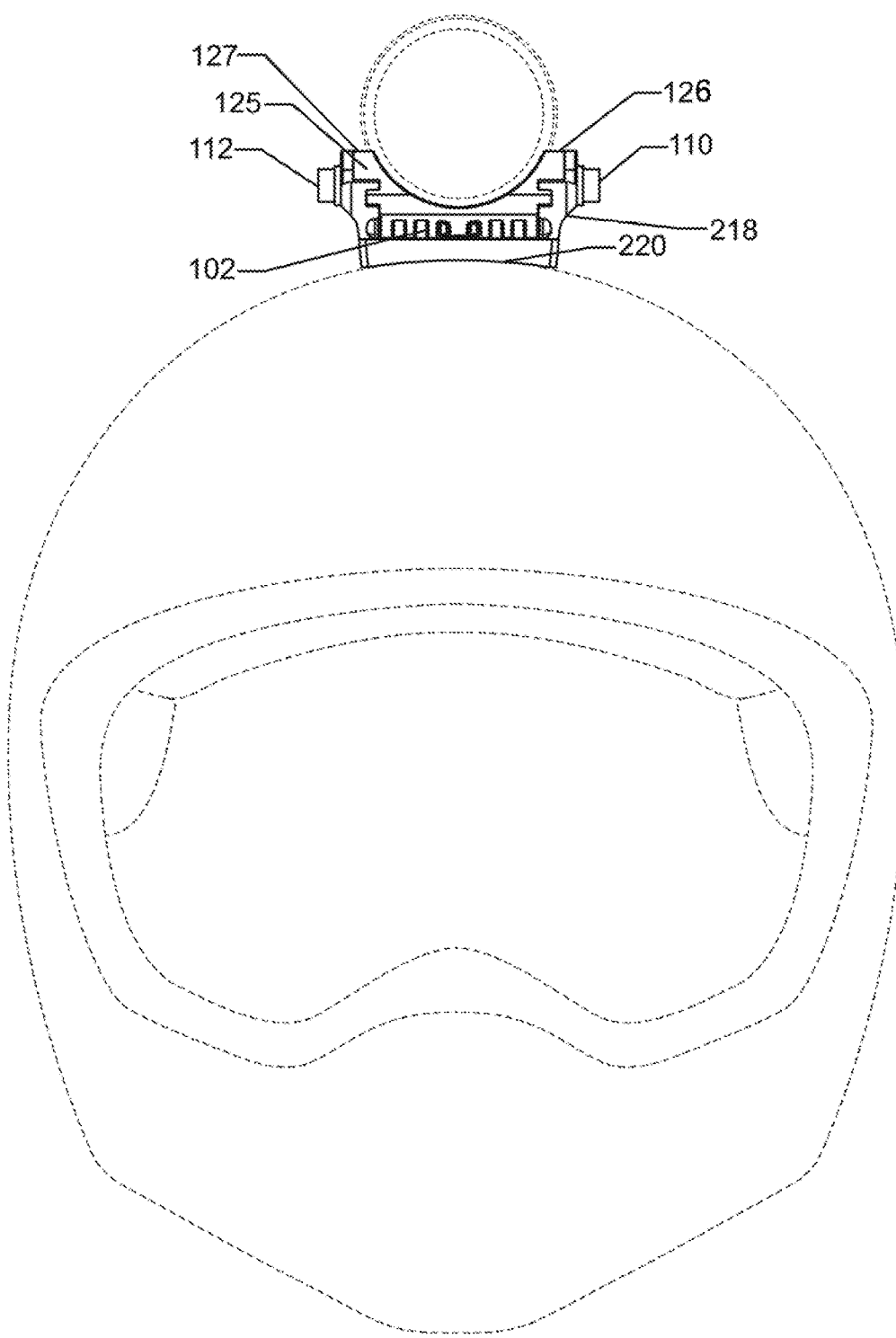
FIG. 15 shows a front elevation view of the attachment device as attached to an example motorcycle helmet, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

This current invention covers the field of application where users are required to wear a helmet for safety consideration and where users are in need of an apparatus that can hold a light for times of limited visibility or to have an apparatus that can hold other devices that the user requires. One or more embodiments may have usage is in the field of motorcycle riding, especially during racing at night, where use of lights that are mounted on the user's helmet is desired. Other embodiments may have usage as well, where other types of helmets may be required. The current state of the art does not exist for such an apparatus that is capable of holding an entity (such as accessories, lights, cameras, etc.) where that entity can be easily adjusted and where the apparatus is removable from a helmet without the use of tools.

FIG. 1 shows an apparatus 1 with its two principle components, mounting component 200 and cradle component 100, which have been conjoined through guiderails 105, 145 that integrate with receiving grooves 205 and 209 principally where the friction inducing elements 110 and 112 prevent or allow for angular movement between cradle 100 and mounting component 200, according to an embodiment. In one embodiment, the apparatus 1 functions as mounting component 200 is attached to a helmet as shown in FIG. 15 through an attachment portion connected to bottom surface 220 and the surface of the helmet, and cradle 100 is thereon allowed to be adjusted angularly through the vertical plane along slots 234 and 226.

Returning to FIG. 1, in one example, the apparatus may be adjusted through the horizontal plane by the removing of an entity without the use of any tools (e.g., via hand power), and replacing of the apparatus 1 in the desired location along the horizontal plane. The entity may also be adjusted through the vertical plane without use of tools (e.g., via only using hand power) to loosen the friction inducing elements 110 and/or 112, adjusting the entity through the vertical plane and tightening the friction inducing element 112 once the desired vertical level is achieved. In one embodiment, cradle 100 is adaptable to a range of entities from lights to cameras and to any entity that is mountable. The attachment portion 220 uses a reclosable fastening system and, as such, is designed so as to allow for multiple removals and attachments and to have only a minimal remainder on the helmet after removal so as to prevent the accidental striking and removal of the integrating portion left on the helmet through contact. The ease of removal is also critical so that the apparatus 1 as a whole can be removed for cleaning and adjusting with easy reattachment. The ease of removal is also desired as an accidental striking of the apparatus 1 will remove the apparatus 1 easily rather than trying to resist removal subjecting the entity to damage. In one embodiment, surface of the attachment portion 220 as detailed in FIGS. 7 and 8 is a contoured angularly defined surface which would match the contour of a geodesically shaped helmet as shown in FIG. 15. Another embodiment, not shown, includes the surface 220 being contoured into a single plane for attachment onto flat surfaces.

In one embodiment, cradle component 100 has an upper exterior side 120 bounded by rails 126 and 127 respectively. In one or more embodiments, upper exterior side 120 is shaped to accept an entity, such as a cylindrical lighting fixture as detailed in FIGS. 13 and 14, though this shape is not limited to a particular shape (i.e., other shapes may be employed, such as semi-cylindrical, multi-faceted, rectangular, etc.). In one embodiment, the upper exterior side 120 of the cradle component 100 may be have a specific shape based on a specific type of entity, such as designed specifically for a manufacturer that has an entity that does not conform to a specific shape (e.g., not semi-cylindrical throughout, not flat throughout, has varied shapes, etc.) Contained within upper exterior side 120 is the receiving portion of the friction inducing element 112. In yet another embodiment, adapters (not shown) may be attached to the upper exterior side 120 to conform the cradle component 100 to specific shapes of entities. In one example, an adapter having a lower portion conformed to fit to the shape of the upper exterior portion 120 and a top portion configured to conform to the fit of an entity having a different shape than the upper exterior portion.

Proceeding forward to FIG. 9B, a detailed view of the receiving element 125 of the friction inducing element 112 (e.g., a square nut with internal threads, etc.) is shown, according to an embodiment. In one embodiment, receiving element 125 is slideably engaged to the lower portion of receiving element 125 pocket 129, which has vertical walls cut into rail 127 sized to accept receiving element 125 but will not allow for the rotation of receiving element 125 as it is engaged by threaded portion 113 of friction inducing element 112. Pocket 129 is chamfered along chamfered entrance 132 to ease the assembly of receiving element 125 into pocket 129. Threaded portion 113 is allowed to penetrate past receiving element 125 along curved surface 131. Two opposing sides of cradle 100 are designed to accept the friction inducing elements 110 and 112, whereby the opposite side will have pocket 129 cut into rail 126 with the receiving element 125 receiving the threaded portion 113 of friction inducing element 110.

Returning to FIG. 9A, details of one embodiment of the apparatus 1 is shown where cable storage 400 is cut into upper exterior side 120 for entities that have a cord that is attached to the side of the entity. Storage 400 provides for a cable is attached to the side of the entity that is in contact with side 120 to easily exit the cradle component 100 through circular cord relief 123 allowing the entity to lay flat against cradle component 100. The friction inducing elements 110 and 112 have a user interface 161, and 162 through which the user will tighten or loosen the friction inducting elements 110 and 112, respectively. In this embodiment, the user interfaces are circular shaped but this is not a limitation as the shape of the interface may be hexagonal, square or any myriad of geometric shapes, so long as the user is able to adjust the friction inducing elements 110 or 112 using only manual hand power and the use of tools are precluded due to the ease of tighten or loosen by hand.

FIGS. 9A, 10 and 11 show isolated views of the cradle 100, which show the friction inducing head 162 being attached to threaded portion 113, the head 162 being externally located forming the external gripping section of friction inducing element 112 along with shoulder 164. Shoulder 164 applies frictional forces upon exterior portion 216 of curved friction rail 223 as head 162 is rotated thereby advancing the threaded portion 113 through receiving element 125, reversing course of head 162 causes a retreat of the threaded portion, which reduces friction and allows the user to adjust the vertical attitude of a light, camera or other entity. Conversely, the shoulder 162 of head 160 applies or reduces frictional forces upon the exterior portion 217 of curved friction rail 224 as the threaded portion 113 advances or retreats through receiving element 125.

Returning to FIG. 9A, detail of rails 126 and 127 that are the opposed ends of the cylindrical body that constitute the shape of cradle 100 are shown, according to an embodiment. The exterior walls contain reliefs 108 whose size and shape are not particular but are present to create voids in the plastic material, should cradle 100 be made of plastic, to prevent shrinkage or sink marks and to reduce overall product weight and the amount of plastic used, which reduces manufacturing costs. In one example, upon cradle 100 being made of metallic materials, then reducing weight through the removal of material is the preferred method using reliefs 108.

Proceeding to FIG. 11, details of the exterior walls of cradle walls that contain two guiding surfaces 105 and 106 on the left side of the apparatus 1, and two guiding surfaces 145 and 160 on the left side of the apparatus 1 are shown, according to an embodiment. The cylindrical body is bounded by frontal terminating wall 101 and rear terminating wall 124 with the lower edge of frontal wall 101 being formed along frontal leading edge 109 and the lower edge of rear wall 124 being formed along rear wall trailing edge 104. In one embodiment, rear wall 124 contains a semi-circular mounting ring 122, which is adaptable during manufacture to the shape of the entity. Circular cord relief 123 is designed to allow for the exit of any cabling emanating from the entity. The front wall 101 contains ring 121, which is adapted to the front portion of the entity to be held as detailed in FIG. 12.

In one embodiment, the lower external surface 165 of cradle 100 has relief slots 102 positioned so as to prevent shrinkage or sink marks in plastic materials or reduction of weight for metallic materials. The size, shape and number of slots are not critical so long as sink marks are not visible. Piercing through the cradle 100 and along the longitudinal axis of the cradle 100 is a utility hole 103 with countersink 103a. Should the mounting of an entity require a threaded mount, the utility hole 103 is the access for that mount and countersink 103a allows for complete submersion of the mounting screws so as to prevent any exposure which would comprise the motion of the cradle 100.

As shown in FIG. 11, the cradle 100 has two principal guide rails which interface with mounting component 200 receiving rails in such a manner as to permit ease of a sliding interface between the receiving grooves and guiding rails while having a tight enough interface to prevent vertical displacement of cradle 100 from the mounting component 200 during use, according to an embodiment.

Returning to FIGS. 1 through 4, details are shown of the interface between cradle 100 and mounting component 200 along the guide rails 105/145 and receiving grooves. Lower left side guiderail 105 protrudes along the lower exterior longitudinal axis of cradle 100 defined by vertical wall 105b and horizontal wall 105a, according to an embodiment. Upper left side guide rail 106b is formed by the continuation of vertical wall 105a and the upper edge 106a of guide rail 105 and the upper terminating edge 106b. Lower right side guide rail 145 protrudes along the lower exterior longitudinal axis of cradle 100 defined by vertical wall 145b and horizontal wall 145a. Upper right side guiderail 160 is formed by the continuation of vertical wall 145b and the upper edge 160a of guide rail 145 and the upper terminating edge 160b. In one example, the shape of lower guide rails 105 and 145 and upper guide rails 106 and 160 are defined as two congruent arcs sharing a common center point. In one embodiment, it is desired that cradle 100 when interfaced with mounting component 200 is capable of angular movement between 70 and 135 degrees, preferably 100 degrees.

In one embodiment, mounting component 200 contains a lower attachment surface 220 and upper surface 202 as detailed in FIGS. 5 through 8 without cradle 100 being attached for clarity only. Lower attachment surface 220, as detailed in FIG. 8, is bounded by longitudinal edges 242 and 246 and latitudinal edges 241 and 244. Longitudinal edges 242 and 246 are angularly defined as arcs that share a common center and latitudinal edges 241 and 244 are angularly defined as arcs that share a common center as detailed in FIG. 8. The shape and the radii of the arcs are defined by the shape of the helmets to which the apparatus 1 is to be attached as seen in FIG. 15. In one embodiment, the attachment portion of apparatus 1 is designed to have reclosable fastening spacer/riser device, such as 3M® DUALLOCK® or a hook and loop style fastener adhered to lower attachment surface 220, with an opposing side attached to the helmet, that will allow the user to remove and replace the apparatus 1 with ease and will only leave a de minimis remainder on the surface of the helmet. Furthermore, a reclosable fastener system will allow for a quick removal of the apparatus 1 should the user have an object strike the apparatus 1. This breakaway feature enables the user to retrieve his apparatus rather than having the attachment means be too rigid as to try to prevent dislodgement, thereby placing the helmet user and the entity attached at great risk of damage or destruction.

In one embodiment, emanating from edges 241, 242, 244 and 246 are vertical walls 219, 221, 201 and 222, respectively forming the upper surface 202. Vertical walls 222, 221 continue vertically forming rail walls right 212 and left 213. Left side and Right side rails are detailed in FIG. 5 and FIG. 6, respectively. Rail wall 212 contains upper receiving groove 208 and lower receiving groove 205 where both upper 208 and lower 205 receiving grooves are angularly related to upper left side guide rail 160 and lower guide rail 145, where each arc shares a common center point. In one embodiment, lower receiving groove 205 being defined as the slot removed from rail wall 212 having an upper bound 206 and a lower bound 207. The distal portion of rail wall 212, as detailed in FIG. 5, is terminated with upper receiving groove 208 which is angularly related to upper left side guide rail 160. Adjacent to upper receiving groove 208 is curved friction rail 224 defined as a slot 228 angularly related to the arc of upper guide groove 208 which has an upper boundary 230 and a lower boundary 226, the boundaries being congruent to each other and defining slot 228.

In one embodiment, rail wall 213, as detailed in FIG. 6, contains upper receiving groove 233 and lower receiving groove 209 where both upper 233 and lower 209 receiving grooves are angularly related to upper right side guide rail 106 and lower guide rail 105, where each arc shares a common center point. Lower receiving groove 209 being defined as the slot removed from rail wall 213 having an upper bound 236 and a lower bound 211. In the assembly of the cradle 100 into the mounting component 200, the interface between the two parts are the guiderails 105/145 of the cradle 100 that are placed into the receiving rails of the mounting component 200. Lower receiving rails perpendicular walls 247 and 248 are designed to provide the free movement of the cradle 100 on a non-linear path that is angularly defined. Likewise, upper receiving rails perpendicular walls 250 and 251 are designed to provide for the free movement of the cradle 100. The tolerance between the guiderails 104/145 and the receiving rails are no greater than to promote free movement between the cradle 100 and the mounting component 200.

The distal portion of rail wall 213 is terminated with upper receiving groove 233, which is angularly related to upper right side guiderail 106. Adjacent to upper groove 233 is curved friction rail 223 defined as a slot 234 angularly related to the arc of upper receiving groove 233, which has an upper boundary 227 and a lower boundary 229, the boundaries being congruent to each other and defining slot 234. The use of the friction inducing means 110 and 112 acts upon the cradle 100 and the mounting component 200, where the cradle 100 contains an internally threaded receiving element, 125 and the mounting threaded portion 113 has inserted therethrough slots 228 and 226, the mounting threaded portion 113 having an externally accessible head as a user interface 161 and 162 and friction inducing shoulders 163 and 164, respectively. The operator will tighten the friction inducing element 110 by turning the externally accessible head of interface 161, which is attached to the threaded portion 113 and which threadably engages into the receiving element 125. As the threaded portion 113 advances through the receiving element 125, the friction inducing shoulder 163 is forcibly brought into contact with the upper boundary 227 and lower boundary 229 causing increased friction between the cradle 100 and the mounting component 200 as the operator reduces the distance between the cradle 100 and the mounting component 200 until the operator has sufficiently induced enough friction to prevent movement of the cradle 100 in relation to the mounting component 200. The operator can then reverse the threaded portion 113 out of the receiving element 125 to reduce the forced contact and subsequent friction to provide movement along the guiderail as constrained by the slot. This embodiment has two friction inducing elements 110/112, locationally opposed across the upper exterior surface 120 and each work in the same manner with the same resultant forces.

In one embodiment, rail walls 212 and 213 have reliefs 203 cut into the leading edges of the rail walls 212 and 213, which serve to reduce material, either for the prevention of sinks and/or the reduction of weight as seen in FIG. 7. FIG. 8 details the exterior reliefs 218 that are cut into the exterior of rails walls 212 and 213. Similar to interior relief 203, the design of the exterior reliefs 218 are not critical to the functioning of the apparatus but serve to reduce unnecessary weight and to prevent sink marks. In this embodiment, relief 203 and exterior relief 218 are cylindrical in nature, but other shapes are possible.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   a helmet mounting component including an internal surface and an opposed exterior surface configured to adapt to a curvature of a helmet via an attachment portion, said helmet mounting component having angularly defined slots and curved receiving grooves;
   a cradle comprising an upper exterior portion configured to receive an accessory, a lower exterior portion including a first plurality of relief slots and a second plurality of relief slots, at least one friction receiving portion, an interior surface adaptable to a shape of the accessory, an accessory securement element, a utility hole, a cord relief portion and non-linear rails to integrate and removably couple said cradle to said helmet mounting component via said non-linear rails positioned within the curved receiving grooves, wherein each relief slot of the first plurality of relief slots has a length greater than each relief slot of the second plurality of relief slots; and
   an integrated friction element disposed between said helmet mounting component and said cradle that is configured to adjust position of the cradle relative to the helmet mounting component.

2. The apparatus of claim 1, wherein said friction element comprises a male segment and a female segment that act in unison to increase friction between said non-linear rails and said helmet mounting component, and said friction element produces friction through use of force directly applied to said friction element to provide or to prevent non-linear movement of said cradle in relation to said helmet mounting component.

3. The apparatus of claim 1, wherein said interior surface of said cradle has a semi-circular shape to receive a cylindrical shaped accessory.

4. The apparatus in claim 1, wherein said interior surface of said cradle is configured to receive a rectangular shaped accessory.

5. The apparatus of claim 1, wherein said non-linear rails comprise opposing integrated congruent guiderails, said congruent guiderails including a protruding component and a receiving component, said congruent guiderails provide constrained movement between said helmet mounting component and said cradle conjointly lengthwise along a non-linear movement path.

6. The apparatus of claim 5, wherein said non-linear movement path is along an angularly defined arc, and said arc between 70 to 135 degrees.

7. The apparatus of claim 6, wherein the accessory is one of a light or a camera.

8. The apparatus of claim 1, wherein said attachment portion provides for proper detachment of the apparatus from a helmet without the use of tools.

9. The apparatus of claim 8, wherein said attachment portion provides for removal and immediate replacement of said apparatus without requiring external components.

10. The apparatus of claim 9, wherein said attachment portion comprises reclosable hook and loop fastening surfaces.

11. The apparatus of claim 9, wherein said attachment portion comprises a reclosable spacer or riser fastening system.

12. The apparatus of claim 1, wherein said friction element comprises at least one male threaded portion and at least one equivalently internally threaded receiving portion.

13. The apparatus of claim 1, wherein said friction element tightens or loosens without the use of tools.

14. An apparatus consisting of:
   a helmet mounting component including an opposed exterior surface configured to adapt to geometry of a surface via a reclosable attachment portion, said reclosable attachment portion provides for removal from and immediate replacement of said apparatus to said surface, said helmet mounting component having angularly defined slots, non-linear coupling guide rails and curved receiving grooves;
   a cradle consisting of an upper exterior portion configured to receive an accessory, a lower exterior portion including a first plurality of relief slots and a second plurality of relief slots, an accessory securement element, a utility hole, a cord relief portion and non-linear rails that provide restrained non-linear movement of the cradle within the helmet mounting component, said non-linear rails being accepted into said curved receiving grooves of said helmet mounting component, integrating said cradle to said helmet mounting component, wherein each relief slot of the first plurality of relief slots has a length greater than each relief slot of the second plurality of relief slots; and
   an integrated friction element disposed between said helmet mounting component and said cradle that is configured to adjust a fixed position of the cradle relative to the helmet mounting component;
   wherein:
   said non-linear rails each include a protruding component and a receiving component;
   said helmet mounting component possessing a protruding or receiving component that opposes and is conjoined to the protruding or receiving component of said cradle;

said non-linear coupling guide rails providing constrained movement between said helmet mounting component and said cradle and are conjointly lengthwise along a non-linear movement path;

the integrated friction element produces:
friction through use of force applied to a friction inducing element to allow or to prevent non-linear movement of said cradle in relation to said helmet mounting component, and
force to prevent said non-linear movement using said integrated friction element that is generated through turning, said force not requiring the use of tools to adjust said integrated friction element; and said reclosable attachment portion provides for detachment of the apparatus from a surface without use of tools.

15. An apparatus consisting of:
an attachment portion;
a helmet mounting component including an internal surface and an opposed exterior surface configured to adapt to curvature of a helmet via said attachment portion, said helmet mounting component having angularly defined slots and curved receiving grooves;
a cradle consisting of an upper exterior portion configured to receive an attachable accessory, a lower exterior portion including a first plurality of relief slots and a second plurality of relief slots, a utility hole, a cord relief portion, a front wall including a first semi-circular ring portion, a rear wall including a second semi-circular ring portion, at least one friction receiving portion, an interior surface corresponding to a shape of the attachable accessory, and non-linear rails to integrate said cradle to said helmet mounting component via said non-linear rails placed within the curved receiving grooves, wherein each relief slot of the first plurality of relief slots has a length greater than each relief slot of the second plurality of relief slots; and
a friction element disposed between said helmet mounting component and said cradle that is configured to adjust position of the cradle relative to the helmet mounting component;

wherein:
said friction element includes a male segment and a female segment that act in unison to increase friction between said non-linear rails and said helmet mounting component; and
said cradle having a semi-cylindrical shape.

* * * * *